United States Patent [19]

Saitoh et al.

[11] Patent Number: 6,038,486

[45] Date of Patent: *Mar. 14, 2000

[54] CONTROL METHOD FOR FACTORY AUTOMATION SYSTEM

[75] Inventors: Hiroyuki Saitoh; Kazuhiko Takizawa, both of Tokyo, Japan

[73] Assignee: Scan Technology Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/808,395

[22] Filed: Feb. 28, 1997

[30] Foreign Application Priority Data

Nov. 29, 1996 [JP] Japan ................................. 8-319830

[51] Int. Cl.$^7$ ...................................................... G06F 19/00
[52] U.S. Cl. ................................................. 700/96; 700/9
[58] Field of Search ..................... 364/468.01, 468.02, 364/468.03, 468.15–468.17, 474.11, 132, 131, 138, 473.01; 395/200.3, 200.31, 200.33, 200.47–200.49; 707/104; 709/200, 201, 203, 217–219; 700/95, 96, 97, 108–110, 169, 2, 3, 9, 157

[56] References Cited

U.S. PATENT DOCUMENTS

| | | | |
|---|---|---|---|
| 5,388,051 | 2/1995 | Seki et al. | 364/474.11 |
| 5,475,601 | 12/1995 | Hwang | 364/473.01 |
| 5,742,762 | 4/1998 | Scholl et al. | 395/200.3 |
| 5,822,207 | 10/1998 | Hazama et al. | 364/468.03 |

*Primary Examiner*—William Grant
*Assistant Examiner*—Steven R. Garland
*Attorney, Agent, or Firm*—Knobbe, Martens, Olson & Bear, LLP

[57] ABSTRACT

A method of operating, controlling, monitoring and analyzing data of control devices used in the manufacturing devices or equipment of a factory automation system is disclosed. According to the method, the system controls itself and executes operations by reading as necessary in real time data in the form of files saved on a memory medium of each type of control device used in manufacturing devices or equipment.

15 Claims, 10 Drawing Sheets

CONTROL METHOD FOR FACTORY AUTOMATION SYSTEM

BACKGROUND OF THE INVENTION

1. Field of the Invention

The present invention relates to a method of operating, controlling, monitoring, and analyzing data of (hereinbelow referred to as "controlling") control devices (inspection machines, sequencers, etc.) used in manufacturing devices and equipment of a factory automation system.

2. Description of the Related Art

In factory automation systems of the prior art, client software must be developed and installed in advance for each individual control device of every terminal that is to be a client.

The above-described prior-art methods necessitated considerable time for software development for factories employing many control devices, and therefore could not be applied in cases of frequent alteration of manufacturing method. For the same reason, control from any arbitrary location was also not possible.

SUMMARY OF THE INVENTION

The object of the present invention is to provide a control method for a factory automation system that controls control devices from any location without requiring special software.

The present invention provides a control method for a factory automation system that controls itself and effects the operations of control devices used in manufacturing devices or equipment by reading as necessary in real time (while the control devices are in operation) data in the form of files saved on a memory medium for each type of control device.

In accordance with an embodiment of the present invention, control devices are connected to a network, and control devices may be controlled from a remote location by file transfer.

In accordance with another embodiment of the present invention, centralized control of control devices is effected by providing a server for each network and transferring and updating as necessary within the server each type of file for all the control devices connected to the server.

In accordance with still another embodiment of the present invention, remote and centralized control of the control devices is effected by automatically converting the files within said server to HTML (HyperText Markup Language) documents or GIF (Graphics Interchange Format) files, and by altering each type of file that effects control within the server from any personal computer connected to a network via a www browser, by means of HTTP (HyperText Transport Protocol) programs and CGI (Common Gateway Interface) programs.

In this way, control devices may be controlled from any location without the need for specialized software.

In addition, the control system according to the present invention 1) simplifies the work of a factory manager; enables outsourcing the control of equipment requiring special skill, knowledge, and experience to the charge of the maker; and furthermore, allows a reduction of workforce through overall management by a full-time technician; and 2) improves speed of response in dealing with urgent problems and the immediacy of investigation or response by a machine manufacturer.

Furthermore, the present invention enables easy control of control devices from a terminal such as a personal computer from any location in the world through the use of an ordinary www browser and without the need for special applications.

The above and other objects, features, and advantages of the present invention will become apparent from the following description with references to the accompanying drawings which illustrate an example of the present invention.

DETAILED DESCRIPTION OF THE PREFERRED EMBODIMENTS

Figure 1:
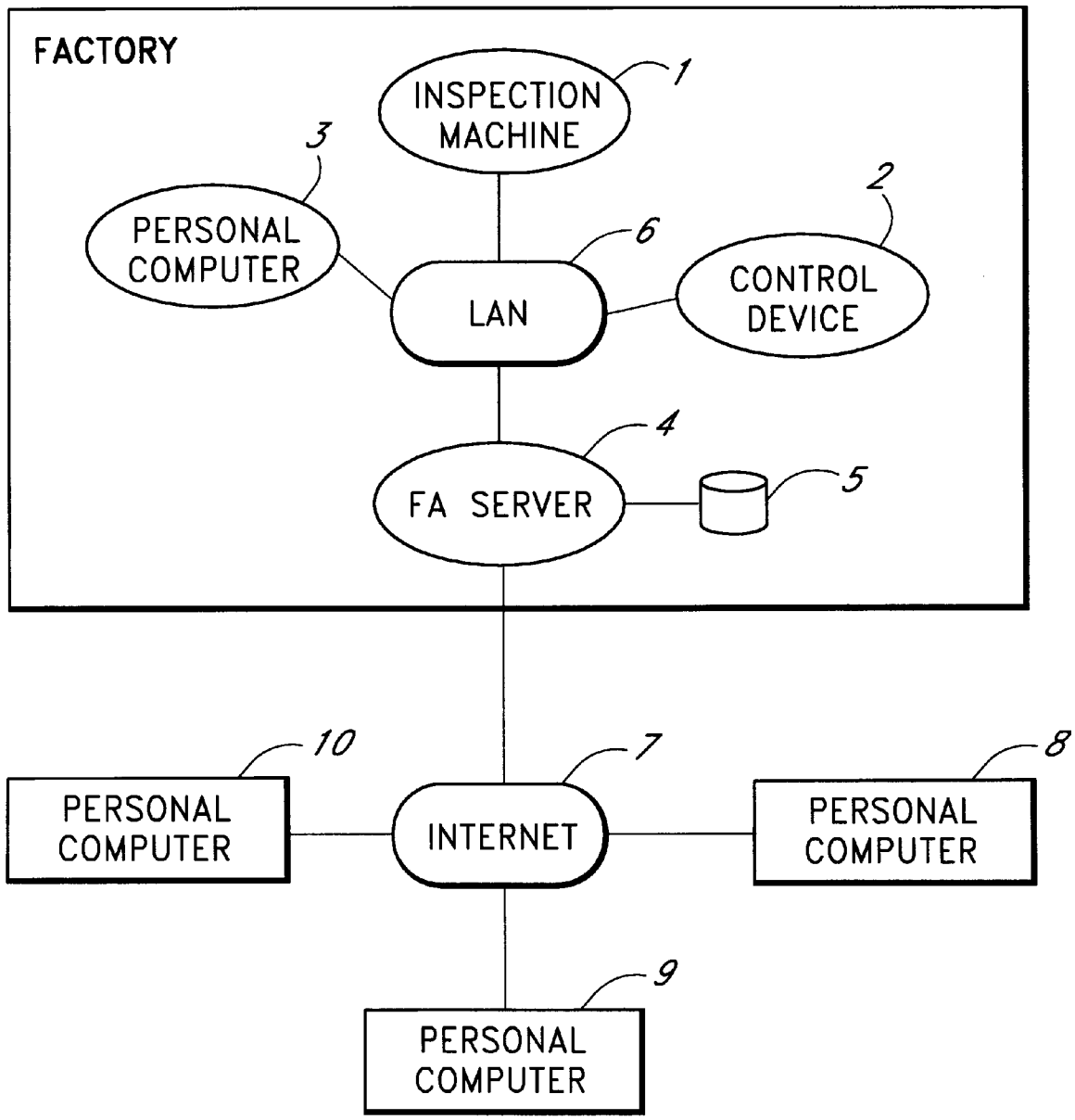
FIG. 1 is structural view of an FA (factory automation) server system according to one embodiment of the present invention.

Referring to FIG. 1, the FA (factory automation) server system according to one embodiment of the present invention is made up of: inspection machine 1 that checks manufactured products; control device 2 that exercises control over the various types of machinery and devices including manufacturing devices, gauges of, for example, flow volume or liquid measure, etc., air conditioning and lighting equipment, equipment for conveying materials, raw materials, and manufactured articles; monitoring cameras, smoke detectors, and fire inspection machines; personal computer 3; FA server 4 provided with common disk 5; and LAN 6 that connects these components together; and moreover, the FA server system is further connected by way of Internet 7 to personal computer 8 of, for example, a head office, business office, warehouse, separate factory, cooperating company, customer, or supplier; personal computer 9 of a maker of machinery or equipment; and an arbitrary personal computer 10.

Figure 2:
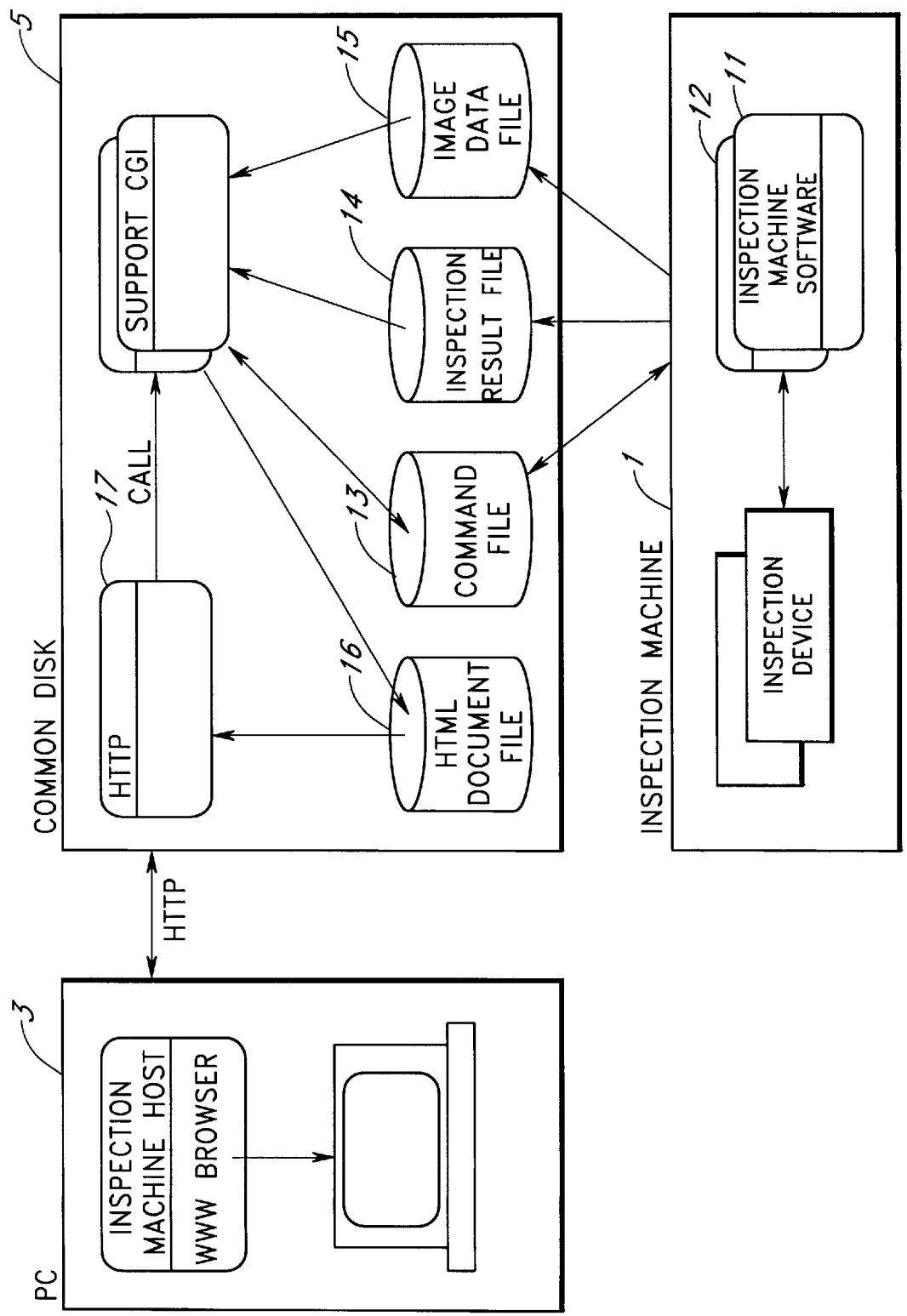
FIG. 2 is a structural view of the software of FA server 4.
Figure 3:
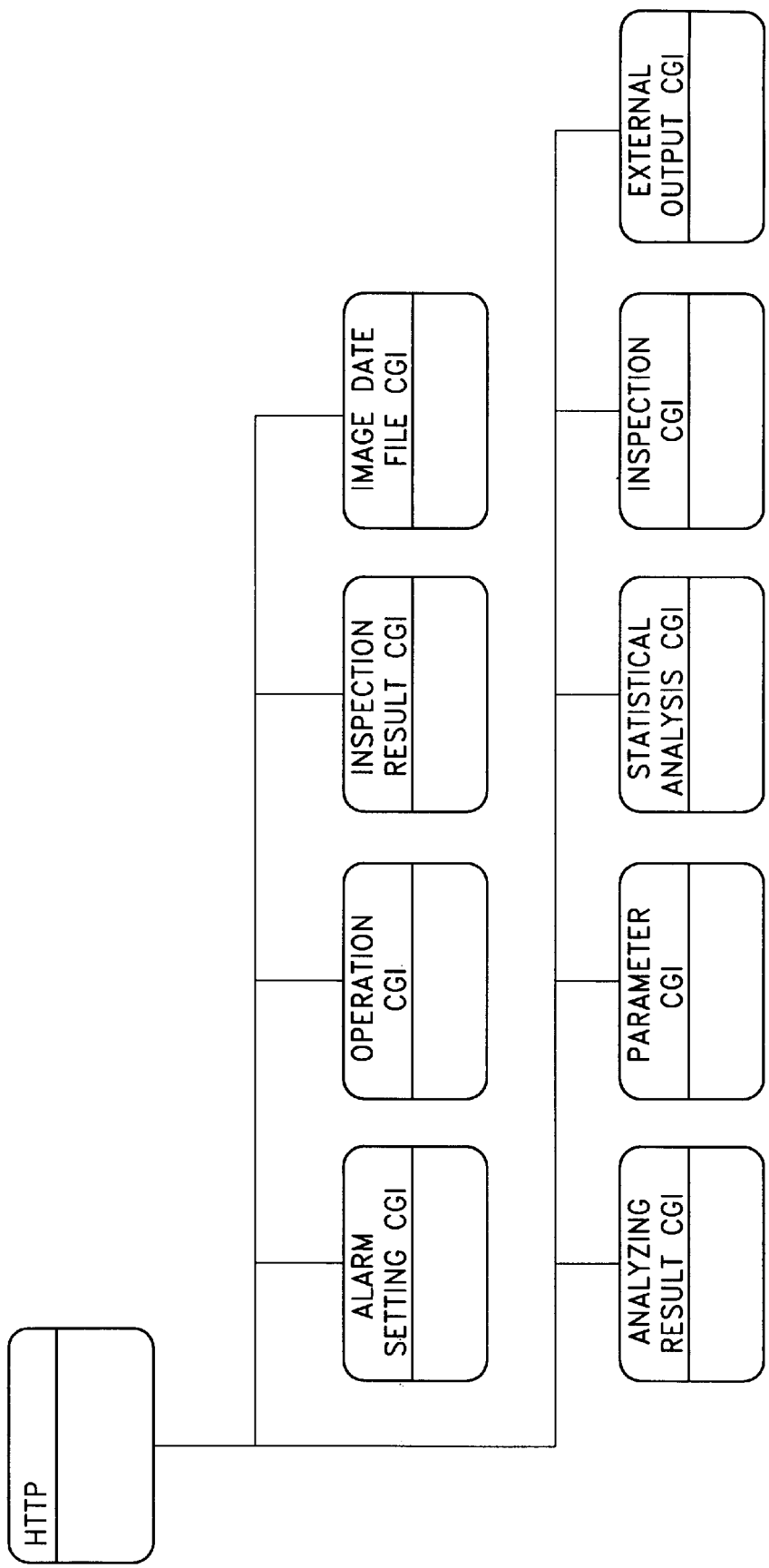
FIG. 3 is a structural view of the software of FA server 4.

FIGS. 2 and 3 are structural views of the factory automation system software of this embodiment.

Inspection machine 1 includes file-generating program 11 for file transfer and inspection machine data management file operation converting program 12.

The file-generating program 11 for file transfer automatically generates the following files, holds the files in memory (not shown in the figure) as necessary, and transfers the files to FA server 4 as necessary:

1) Inspection execution file: file for a program that executes an inspection;

2) Inspection machine network management execution file: file for a program that manages the network of inspection machine 1;

3) Operation file: file for a program that instructs operations (such as activation, inching, halting) of inspection machine 1;

4) Parameter file: setting file of each of the parameter values of inspection machine 1;

5) Status file: setting file for checking the operation state of inspection machine 1;

6) Inspection result file: file for saving inspection result data;

7) Inspection result analysis file (data): file for managing data serving as inspection criteria;

8) Inspection result analysis file (image): file for managing image data serving as inspection criteria;

9) Self-diagnosis file: file for managing results of self-diagnosis of inspection machine 1;

10) Peripheral equipment control file: file for managing the history of input/output data transmitted from inspection machine 1;

11) Alarm setting file: file of program for setting alarm output conditions;

12) External output file: file for program for outputting data to the outside; and 13) Processing results file: file for managing results of operations such as statistics and analysis based on the data of inspection result files.

In addition, inspection machine 1 sequentially opens the files 1, 2 and 3 described hereinabove to control itself.

Figure 4:
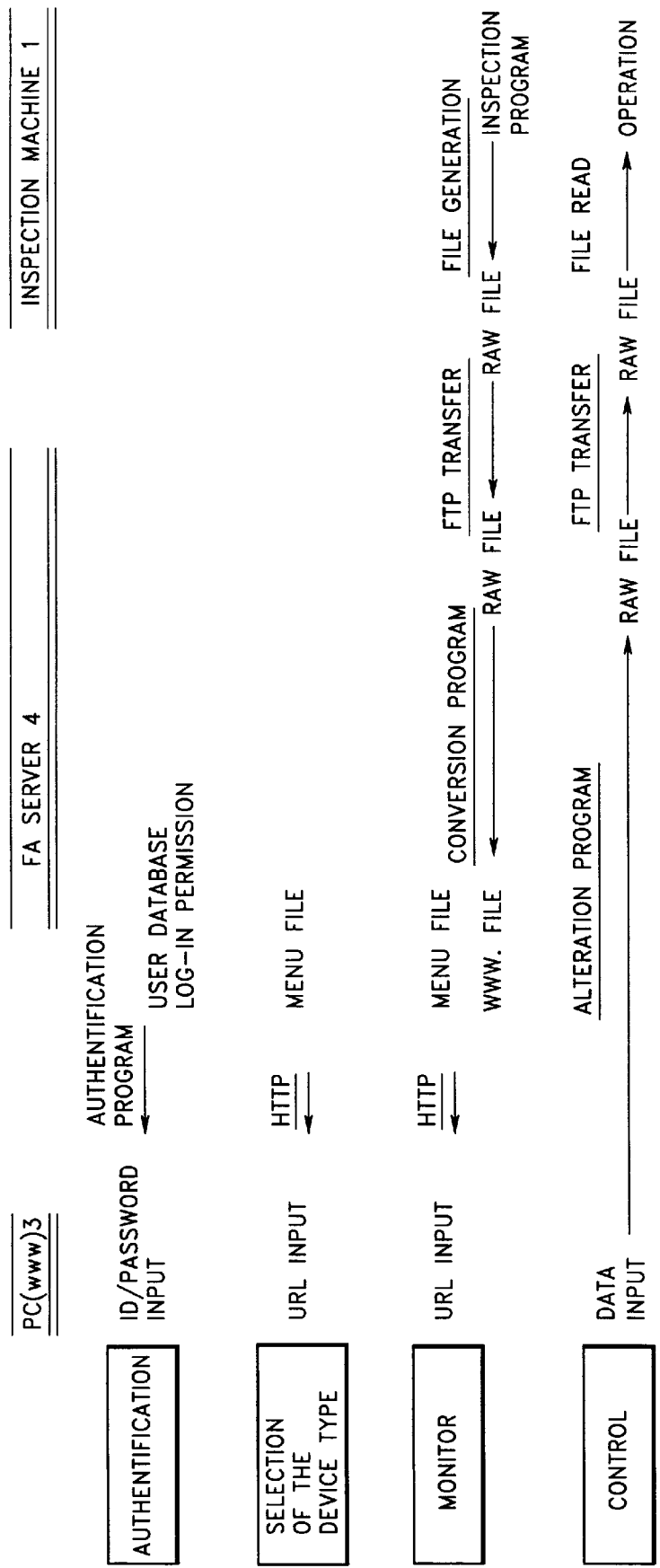
FIG. 4 is a conceptualized sequence chart showing the operation of the FA server system shown in FIG. 1.

FIG. 4 is a sequence chart showing an outline of the operation of this embodiment.

Upon input of an ID or password to the www (world wide web) from personal computer 3 in an authentication operation, the authentication program of FA server 4 retrieves the user database and both allows log-in and transmits a menu file to personal computer 3 by www delivery program HTTP, and the user of personal computer 3 selects the device type and inputs a URL (Uniform Resource Locator). The inspection program of inspection machine 1 generates a raw file of inspection results and transfers the file to FA server 4 by FTP (File Transfer Protocol). FA server 4 converts the raw file to a www file by means of an automatic conversion program for www documents, and transmits the converted www file with a menu file to personal computer 3 by means of www delivery program HTTP. The user of personal computer 3 alters the content of the file, transfers the raw file to inspection machine 1 by FTP through FA server 4, and inspection machine 1 reads the file and operates accordingly.

FA server 4 is provided with the a user database, which is a database of the IDs and passwords for allowing log-in, a program for identifying and authenticating logged-in users, www delivery program HTTP, and an automatic conversion program for www documents. FA server 4 retains file data transmitted from inspection machine 1 without alteration according to inspection machine type in FA server files 13, 14, and 15. These file data are automatically converted to HTML syntax by an automatic HTML conversion program, and saved in data region 16 of www delivery program HTTP 17. If there is a need for statistics processing, detection of abnormalities, or display thereof upon conversion, the operation is executed at this time.

Through access of FA server 4 by means of a www browser, personal computer 3 connected to LAN 6 and personal computer 10 connected to the Internet 7 may monitor and correct the information of inspection machine 1 through FA server 4 by CGI (Common Gateway Interface).

Figure 5:
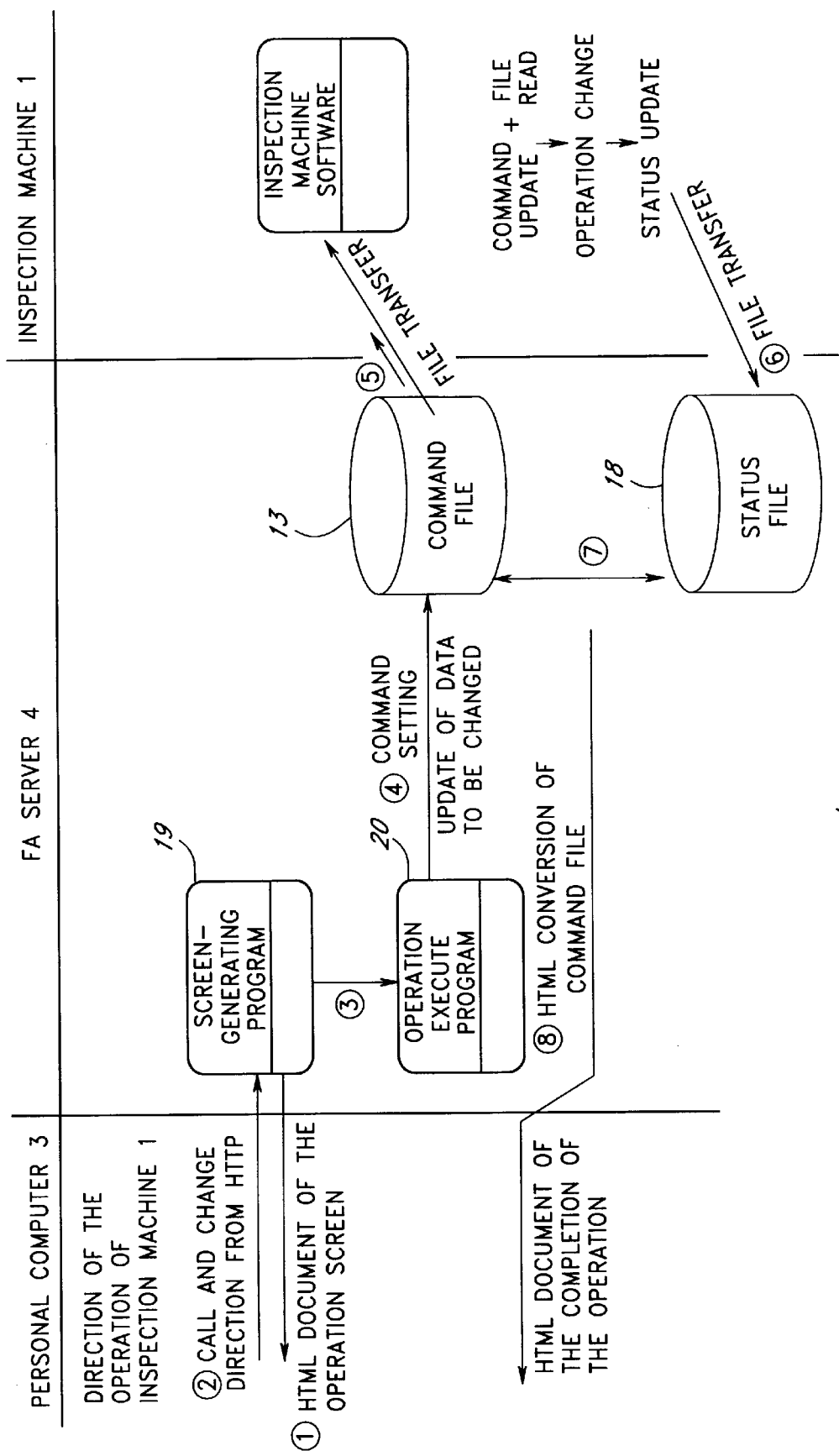
FIG. 5 is a sequence chart for a case in which operation instructions are conveyed from personal computer 3 to inspection machine 1.

FIG. 5 is a sequence chart for a case in which the operation of inspection machine 1 is directed from personal computer 3. The user of personal computer 3 writes the instruction content to www, this content is indicated to the screen of FA server 4 by means of screen-generating program 19, and an HTML document of the operation screen is sent to personal computer 3. The user of personal computer 3 views this screen and indicates the values to be changed. The operation execute program 20 of FA server 4 sets commands for data change for only the altered portions in command file 13, and command file 13 is file-transferred to inspection machine 1. At inspection machine 1, commands are updated, operation is changed, and status is updated. The updated status is file-transferred to FA server 4 and stored in status file 18. The collation program in FA server 4 collates the status within command file 13 with the status of status file 18, HTML-converts commands within command file 13 if they match, and sends the HTML document of operation completion to personal computer 3.

Figure 6:
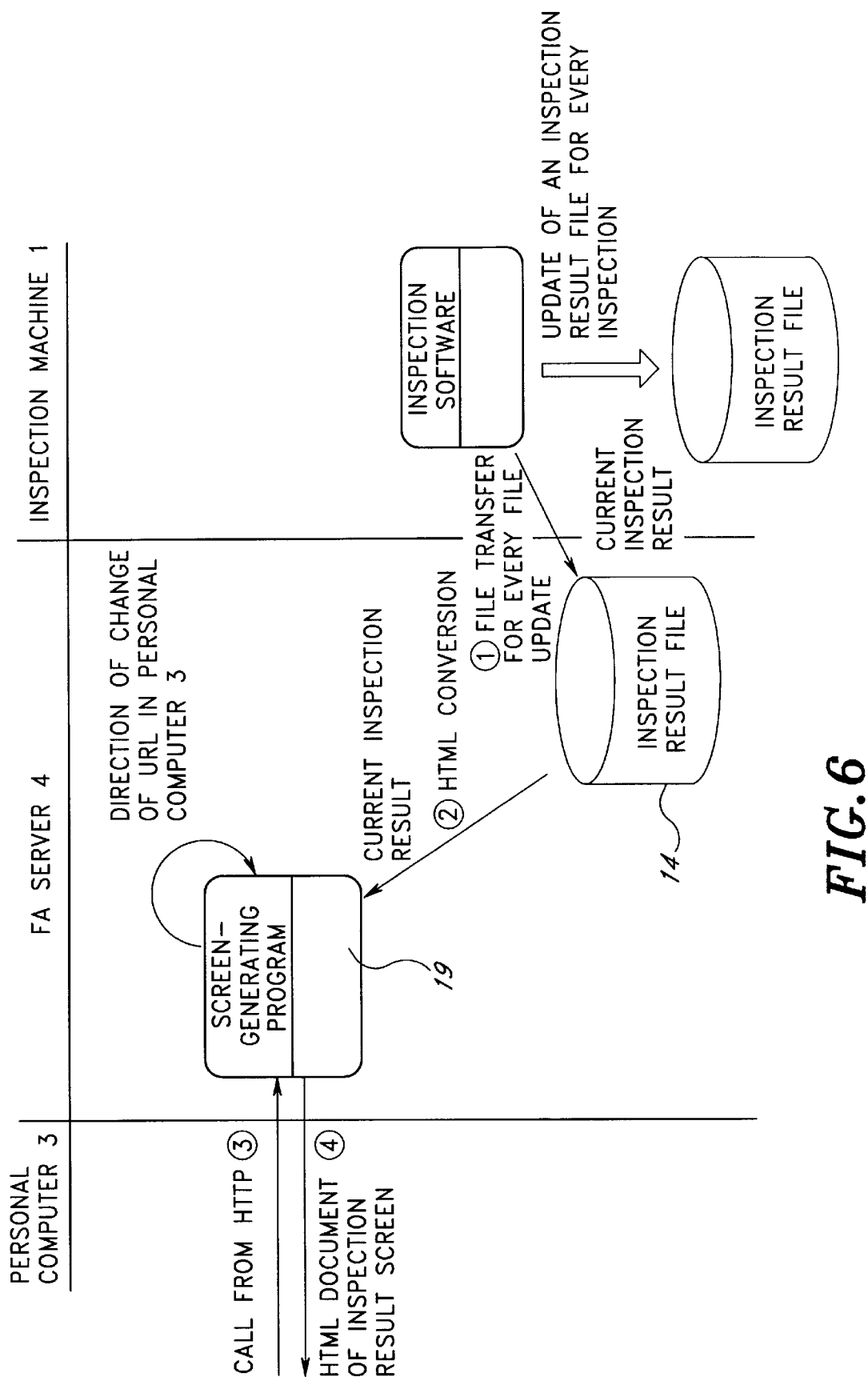
FIG. 6 is a sequence chart showing a case in which the investigation results of inspection machine 1 are obtained at personal computer 3.

FIG. 6 is a sequence chart for a case in which inspection results of inspection machine 1 are obtained at personal computer 3. The inspection execute program of inspection machine 1 both updates a inspection result file for every inspection, and file-transfers the current inspection results to FA server 4. The file-transferred inspection results are stored in inspection result file 14, HTML-converted, and displayed on the screen using screen-generating program 19. When a call is received at FA server 4 from personal computer 3 by www delivery program HTTP, FA server 4 sends an HTML document of the inspection result image to personal computer 3.

Figure 7:
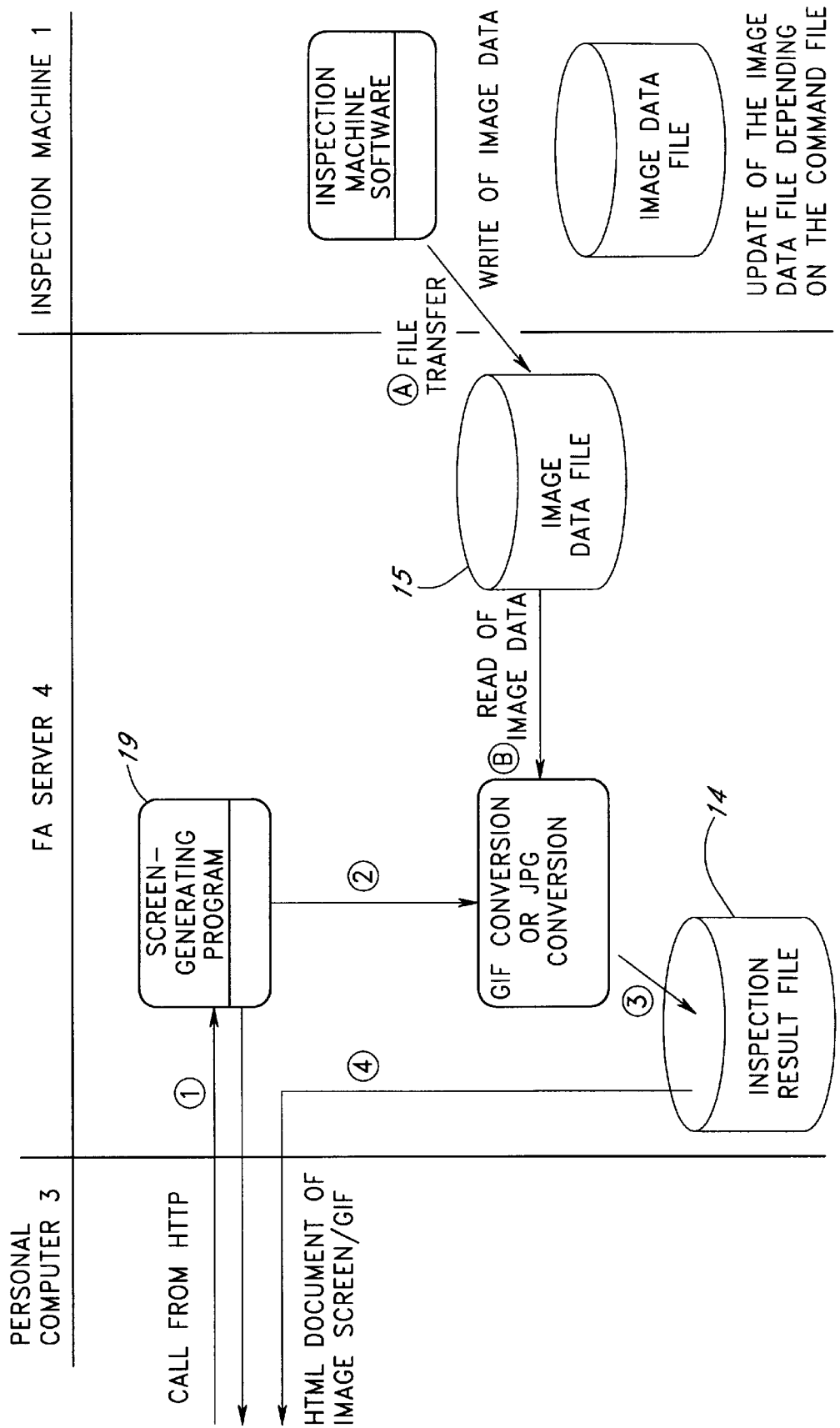
FIG. 7 is a sequence chart showing a case in which image data are obtained at personal computer 3.

FIG. 7 is a sequence chart showing a case in which image data of inspection machine 1 are obtained at personal computer 3. The inspection execute program of inspection machine 1 updates image data of the inspection result analysis file as necessary in accordance with commands, and file-transfers image data to FA server 4. The file-transferred image data are stored in image data file 15 within FA server 4. Here, when a call comes to FA server 4 from personal computer 3 by way of www delivery program HTTP, image data are read from image data file 15, GIF-converted, and stored to inspection result file 14, following which an HTML document of a picture screen is sent to personal computer 3.

Figure 8:
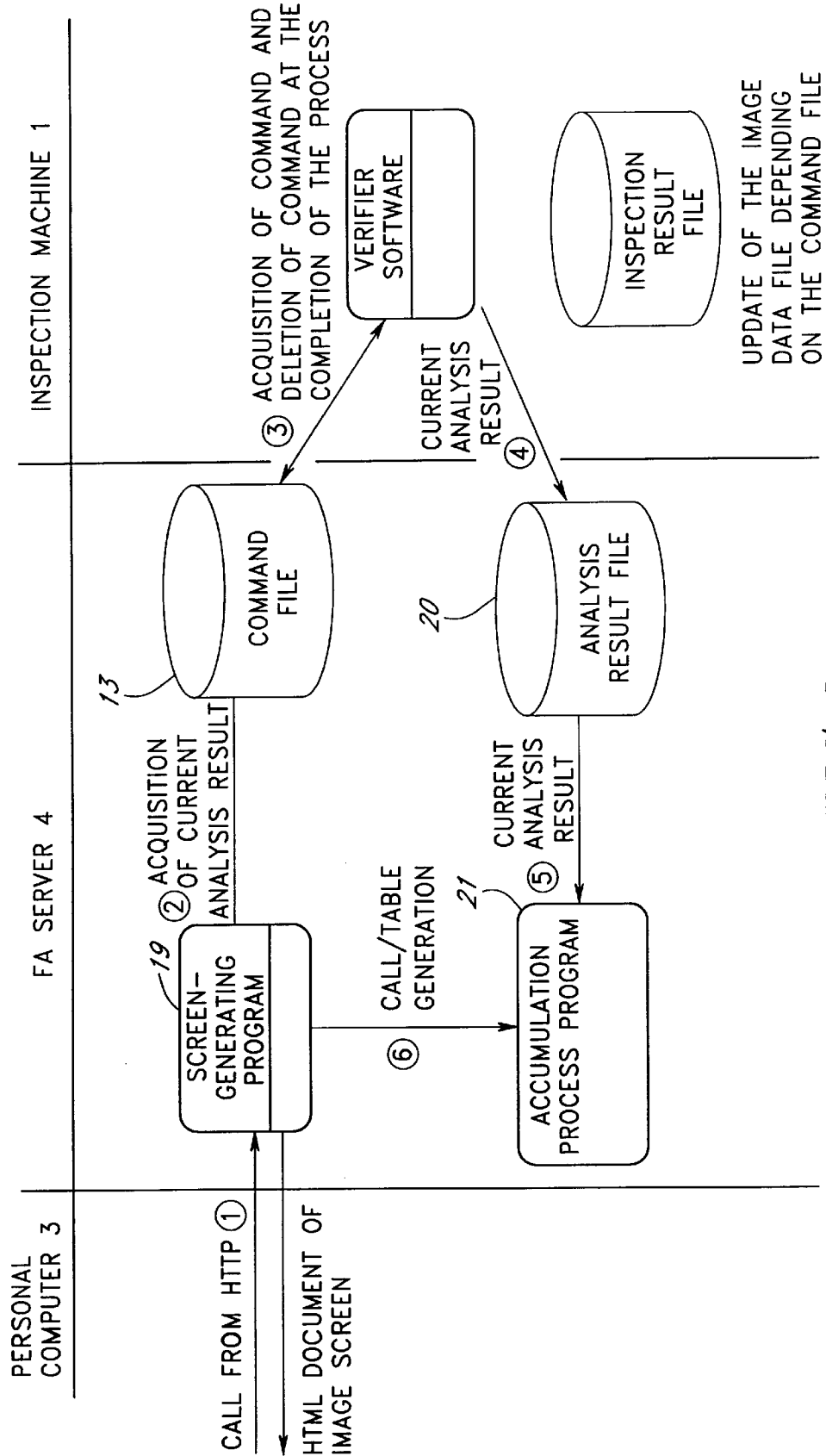
FIG. 8 is a sequence chart showing a case in which analysis results of FA server 4 are obtained at personal computer 3.

FIG. 8 is a sequence chart showing a case in which the analysis results of inspection machine 1 are obtained at personal computer 3. In the event of a call at FA server 4 from personal computer 3 by means of www delivery program HTTP, screen-generating program 19 of FA server 4 stores a command in command file 13 to get the current analysis results and transfers the command to inspection machine 1. In accordance with the command, the inspection execute program of inspection machine 1 updates the inspection results analysis file as necessary, and file-transfers the current analysis results to FA server 4 according to the command transferred from FA server 4. The file-transferred current analysis results are stored in analysis result file 20, following which data distribution, mean value calculation, and statistical examination are executed by accumulating program 21, a table is produced, and an analysis result screen HTML document is transferred to personal computer 3.

Figure 9:
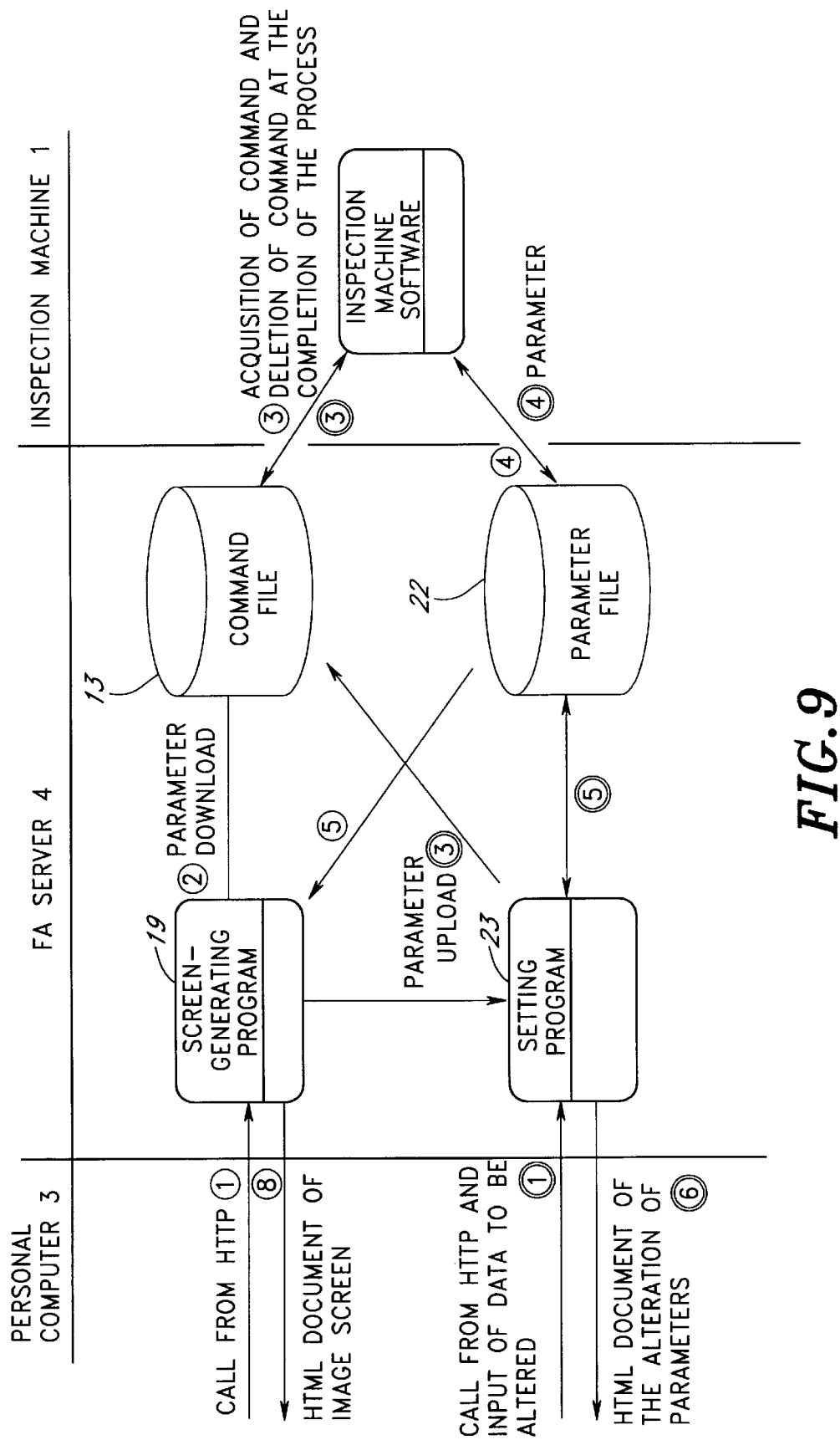
FIG. 9 is a sequence chart showing a case in which the parameters of a parameter file of FA server 4 are read and altered.

FIG. 9 is a sequence chart showing a case in which each parameter of inspection machine 1 is read and altered. When parameters to be read are sent to FA server 4 from personal computer 3 by www delivery program HTTP, screen-generating program 19 downloads parameters to command file 13 and sends the file to inspection machine 1. The inspection execute program of inspection machine 1 extracts parameter values from the parameter file and file-transfers the parameter values to FA server 4. The file-transferred parameter values are stored in parameter file 22 of FA server 4 and HTML-converted, and a parameter read screen HTML document is sent to personal computer 3 by screen-generating program 19. Further, when altered values of the parameters are sent to FA server 4 from personal computer 3 by means of www delivery program HTTP, setting program 23 uploads the parameter alterations to command file 13, and the altered values are stored in parameter file 22. The inspection execution program of inspection machine 1 alters the parameters based on parameter alteration commands and altered values sent from FA server 4 and file-transfers the altered parameters to FA server 4. The transferred parameters are stored in parameter file 22 and collated with the previously stored parameter values. In the event of matching, a correctly rewritten message is generated by means of setting program 23, and a parameter alteration HTML document is sent to personal computer 3.

Figure 10:
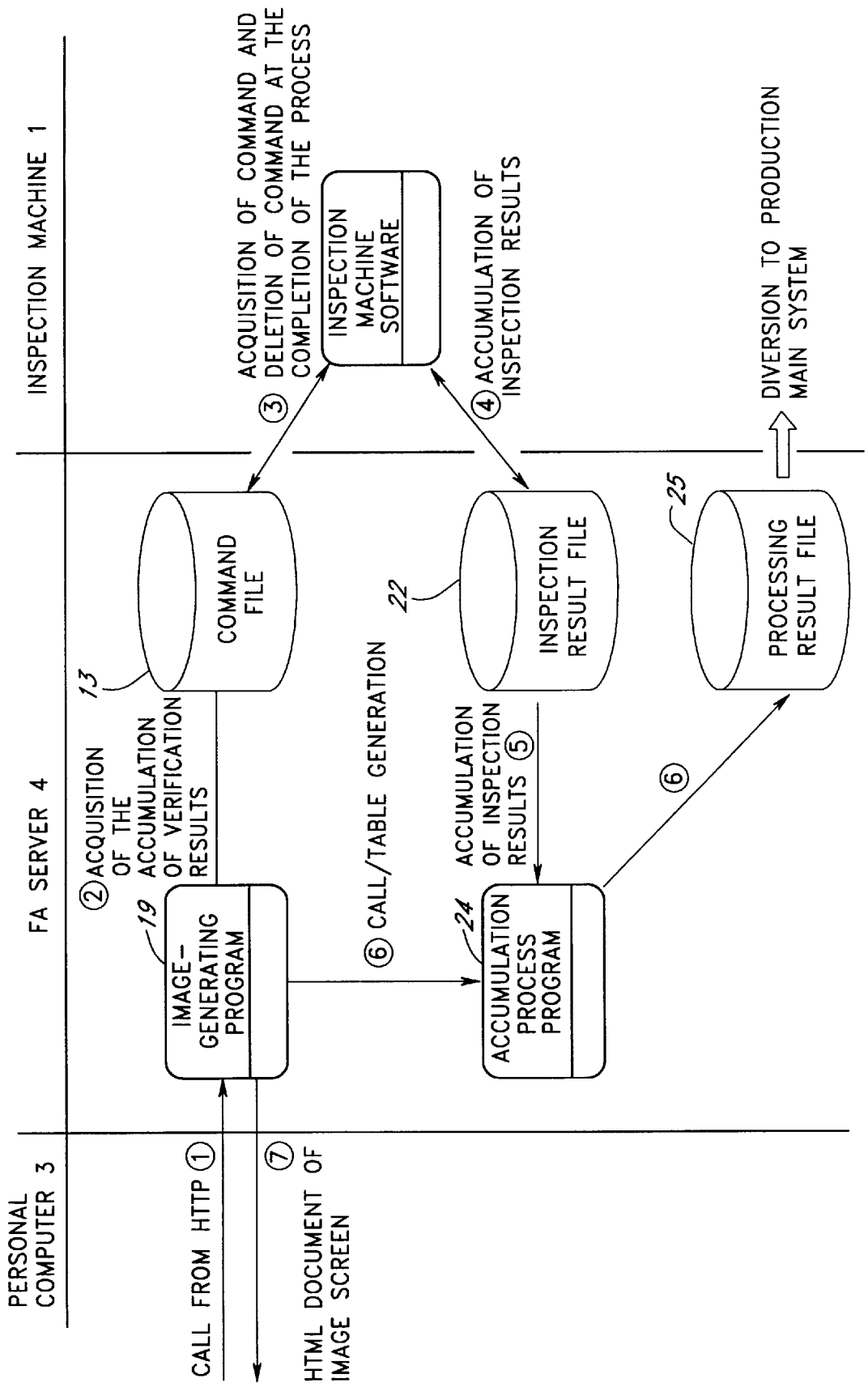
FIG. 10 is a sequence chart showing a case in which the accumulated investigation results of inspection machine 1 are obtained at personal computer 3.

FIG. 10 is a sequence chart showing a case in which accumulation of inspection results of inspection machine 1 is obtained at personal computer 3. When a call comes to FA server 4 from personal computer 3 by way of www delivery program HTTP, screen-generating program 19 stores a command to get accumulated inspection results in command file 13 and transmits the command file to inspection machine 1. The inspection execute program of inspection machine 1 reads the inspection results from the inspection result file and transfers the results to FA server 4. The file-transferred inspection results are stored in inspection result file 14, following which statistical operation is executed by accumulation process program 24, the results are stored in processing result file 25, a call and a table are produced, and a inspection result HTML document is sent to personal computer 3 by screen-generating program 19.

Through analysis methods and combination with data relating to manufacturing record-keeping, process management, and quality control, the current and past data obtained through this FA server system can be effectively applied for cost control, and production planning. Such applications may of course be carried out in tandem with an existing basic system.

While a preferred embodiment of the present invention has been described using specific terms, such description is for illustrative purposes only, and it is to be understood that changes and variations may be made without departing from the spirit or scope of the following claims.

What is claimed is:

1. A control method for a factory automation system that controls itself and effects the operation of control devices used in manufacturing devices or equipment by reading, as necessary while said control devices are in operation, data in the form of files saved on a memory medium for each type of said control devices, wherein centralized control of said control devices is effected by providing a server for each network and transferring and updating as necessary within the server each type of file for all control devices connected to the server.

2. A control method for a factory automation system according to claim 1 wherein remote and centralized control of said control devices is effected by automatically converting said files within said server to HTML (HyperText Markup Language) documents or GIF (Graphics Interchange Format) files, and by altering each type of file that effects control within said server from any personal computer connected to a network via a www browser, by means of HTTP (HyperText Transport Protocol) programs and CGI (Common Gateway Interface) programs.

3. A factory automation system comprising:

at least one control device for controlling manufacturing devices or equipment, each control device being connected to a network and having a memory medium to store data in the form of files, each control device reading the data stored in the memory medium as necessary while each control device is in operation; and a factory automation server connected to the network, the server providing a centralized control by transferring and updating within the server each type of the files for all of the at least one control device connected to the network as necessary.

4. A system as defined in claim 3, further comprising at least one computer connected to a network, wherein the server receives and transfers files between the at least one control device and the at least one computer via the network.

5. A system as defined in claim 4, wherein the server transforms files received from either the at least one control device or the at least one computer before transferring the files to the other.

6. A system as defined in claim 4, wherein the server permits login of the at least one computer upon receipt of a valid at least one of an ID and a password from the at least one computer.

7. A system as defined in claim 4, wherein the network is internet.

8. A system as defined in claim 7, wherein the at least one computer has a world wide web (www) browser and executes the www browser to have a connection to the network.

9. A system as defined in claim 8, wherein the server has a document viewed with the www browser at the at least one computer when connected to the server through the network.

10. A system as defined in claim 9, wherein at least one of an ID and a password is inputted at the www browser to login the server.

11. A system as defined in claim 8, wherein the server has a program to transform a file unable to be viewed with the www browser into a form of file viewed with the www browser.

12. A system as defined in claim 8, wherein the server has a program to transform a file viewed with the www browser to a different form of file.

13. A system as defined in claim 4, wherein the at least one computer is connected to a local area network (LAN) and the LAN is connected to the internet.

14. A system as defined in claim 4, wherein the at least one control device is connected to a local area network (LAN) and the LAN is connected to the internet.

15. A system as defined in claim 4, wherein the server is connected to a local area network (LAN) and the LAN is connected to the internet.

* * * * *